(12) United States Patent
Radibratovic et al.

(10) Patent No.: US 8,401,833 B2
(45) Date of Patent: Mar. 19, 2013

(54) METHOD FOR PREDICTING POWER USAGE EFFECTIVENESS AND DATA CENTER INFRASTRUCTURE EFFICIENCY WITHIN A REAL-TIME MONITORING SYSTEM

(75) Inventors: Branislav Radibratovic, San Diego, CA (US); Kevin Meagher, Raleigh, NC (US); Barry Needle, Cary, NC (US)

(73) Assignee: Power Analytics Corporation, San Diego, CA (US)

( * ) Notice: Subject to any disclaimer, the term of this patent is extended or adjusted under 35 U.S.C. 154(b) by 348 days.

(21) Appl. No.: 12/542,472

(22) Filed: Aug. 17, 2009

(65) Prior Publication Data

US 2010/0049494 A1  Feb. 25, 2010

Related U.S. Application Data

(60) Provisional application No. 61/089,307, filed on Aug. 15, 2008.

(51) Int. Cl.
*G06F 17/50* (2006.01)
*G06G 7/62* (2006.01)
(52) U.S. Cl. .............................................. 703/13; 703/2
(58) Field of Classification Search ................. 703/2, 13
See application file for complete search history.

(56) References Cited

U.S. PATENT DOCUMENTS

| 2005/0033481 | A1 | 2/2005 | Budhraja et al. |
| 2008/0015816 | A1 | 1/2008 | Jammu et al. |
| 2008/0049013 | A1* | 2/2008 | Nasle ............................ 345/419 |
| 2008/0141072 | A1 | 6/2008 | Kalgren et al. |
| 2008/0167844 | A1* | 7/2008 | Nasle et al. ....................... 703/2 |

FOREIGN PATENT DOCUMENTS

| EP | 1103926 A2 | 5/2001 |
| JP | 2002259508 A | 9/2002 |

OTHER PUBLICATIONS

Greenberg et al. "Best Practices for Data Centers: Lessons Learned from Benchmarking 22 Data Centers", 2006 ACEEE.*
International Search Report and Written Opinion related to PCT/US2009/054077 mailed Mar. 5, 2010.

* cited by examiner

*Primary Examiner* — Saif Alhija
(74) *Attorney, Agent, or Firm* — Procopio Cory Hargreaves & Savitch LLP; Noel C. Gillespie

(57) ABSTRACT

A system for making real-time predictions about power usage efficiency (PUE) and/or data center infrastructure efficiency (DCiE) of an electrical system comprises a data acquisition component communicatively connected to a sensor configured to acquire real-time data output from the electrical system; an analytics server communicatively connected to the data acquisition component and comprising a virtual system modeling engine configured to generate predicted data output for the electrical system using a virtual system model of the electrical system, an analytics engine configured to monitor the real-time data output and the predicted data output of the electrical system, and a PUE/DCiE simulation engine configured to use the virtual system model updated based in the real-time data to forecast the PUE/DCiE.

22 Claims, 11 Drawing Sheets

METHOD FOR PREDICTING POWER USAGE EFFECTIVENESS AND DATA CENTER INFRASTRUCTURE EFFICIENCY WITHIN A REAL-TIME MONITORING SYSTEM

RELATED APPLICATION INFORMATION

This application claims the benefit under 35 U.S.C. §119(e) of U.S. Provisional Application Ser. No. 61/089,307, filed Aug. 15, 2008 and entitled "Automated, Real-Time Power Usage Effectiveness and Data Center Infrastructure Efficiency," and which is incorporated herein by reference in its entirety as if set forth in full.

BACKGROUND

I. Technical Field

The present invention relates generally to computer modeling and management of systems and, more particularly, to computer simulation techniques with real-time system monitoring and prediction of electrical system performance.

II. Background

Computer models of complex systems enable improved system design, development, and implementation through techniques for off-line simulation of the system operation. That is, system models can be created that computers can "operate" in a virtual environment to determine design parameters. All manner of systems can be modeled, designed, and virtually operated in this way, including machinery, factories, electrical power and distribution systems, processing plants, devices, chemical processes, biological systems, and the like. Such simulation techniques have resulted in reduced development costs and superior operation.

Design and production processes have benefited greatly from such computer simulation techniques, and such techniques are relatively well developed, but such techniques have not been applied in real-time, e.g., for real-time operational monitoring and management. In addition, predictive failure analysis techniques do not generally use real-time data that reflect actual system operation. Greater efforts at real-time operational monitoring and management would provide more accurate and timely suggestions for operational decisions, and such techniques applied to failure analysis would provide improved predictions of system problems before they occur. With such improved techniques, operational costs could be greatly reduced.

For example, mission critical electrical systems, e.g., for data centers or nuclear power facilities, must be designed to ensure that power is always available. Thus, the systems must be as failure proof as possible, and many layers of redundancy must be designed in to ensure that there is always a backup in case of a failure. It will be understood that such systems are highly complex, a complexity made even greater as a result of the required redundancy. Computer design and modeling programs allow for the design of such systems by allowing a designer to model the system and simulate its operation. Thus, the designer can ensure that the system will operate as intended before the facility is constructed.

Once the facility is constructed, however, the design is typically only referred to when there is a failure. In other words, once there is failure, the system design is used to trace the failure and take corrective action; however, because such design are complex, and there are many interdependencies, it can be extremely difficult and time consuming to track the failure and all its dependencies and then take corrective action that does not result in other system disturbances.

Moreover, changing or upgrading the system can similarly be time consuming and expensive, requiring an expert to model the potential change, e.g., using the design and modeling program. Unfortunately, system interdependencies can be difficult to simulate, making even minor changes risky.

Power Usage Effectiveness (PUE) and Data Center Infrastructure Efficiency (DCiE) are two very powerful analytic tools which enable data center operators to quickly estimate the energy efficiency of their data center, compare the results against other data centers, and determine if any energy efficiency improvements need to be made. However, PUE and DCiE are normally determined manually in an off-line mode. Consequently, a simulation model that allows data center operators to establish a base-line model of their data center and determine the PUE and DCiE using the model is desirable. Furthermore, a simulation model which utilizes an actual model of the facility to validate the base-line model is desirable.

SUMMARY

Methods for making real-time predictions about PUE/DCiE of an electrical system are disclosed.

According to one aspect, a system for making real-time predictions about power usage efficiency (PUE) of an electrical system comprises a data acquisition component communicatively connected to a sensor configured to acquire real-time data output from the electrical system; an analytics server communicatively connected to the data acquisition component and comprising a virtual system modeling engine configured to generate predicted data output for the electrical system using a virtual system model of the electrical system, an analytics engine configured to monitor the real-time data output and the predicted data output of the electrical system, and PUE simulation engine configured to use the virtual system model updated based in the real-time data to forecast the PUE.

According to another aspect, A system for making real-time predictions about data center infrastructure efficiency (DCiE) of an electrical system, comprises a data acquisition component communicatively connected to a sensor configured to acquire real-time data output from the electrical system; an analytics server communicatively connected to the data acquisition component that comprises a virtual system modeling engine configured to generate predicted data output for the electrical system using a virtual system model of the electrical system, an analytics engine configured to monitor the real-time data output and the predicted data output of the electrical system, and a DCiE simulation engine configured to use the virtual system model updated based on the real-time data to forecast the DCiE.

In accordance with still another aspect, a computer-readable medium having instructions thereon, that when executed, cause a computer to perform a method comprising creating a base-line PUE model of the electrical system; and calculating the PUE of the electrical system using the base-line PUE model.

These and other features, aspects, and embodiments of the invention are described below in the section entitled "Detailed Description."

BRIEF DESCRIPTION OF THE DRAWINGS

For a more complete understanding of the principles disclosed herein, and the advantages thereof, reference is now made to the following descriptions taken in conjunction with the accompanying drawings, in which.

DETAILED DESCRIPTION

Systems and methods for providing a base-line model of expected performance of a data center's PUE/DCiE are disclosed. Additionally, systems and methods for providing an actual model of a data center's facility for validating the base-line model are disclosed. It will be clear, however, that the systems and methods described herein are to be practiced without some or all of these specific details. In other instances, well known process operations have not been described in detail in order not to unnecessarily obscure the systems and methods described herein.

As used herein, a system denotes a set of components, real or abstract, comprising a whole where each component interacts with or is related to at least one other component within the whole. Examples of systems include machinery, factories, electrical systems, processing plants, devices, chemical processes, biological systems, data centers, aircraft carriers, and the like. An electrical system can designate a power generation and/or distribution system that is widely dispersed, i.e., power generation, transformers, and/or electrical distribution components distributed geographically throughout a large region, or bounded within a particular location, e.g., a power plant within a production facility, a bounded geographic area, on board a ship, etc.

A network application is any application that is stored on an application server connected to a network, e.g., local area network, wide area network, etc., in accordance with any contemporary client/server architecture model and can be accessed via the network. In this arrangement, the network application programming interface (API) resides on the application server separate from the client machine. The client interface would typically be a web browser, e.g. INTERNET EXPLORER™, FIREFOX™, NETSCAPE™, etc., that is in communication with the network application server via a network connection, e.g., HTTP, HTTPS, RSS, etc.

Figure 1:
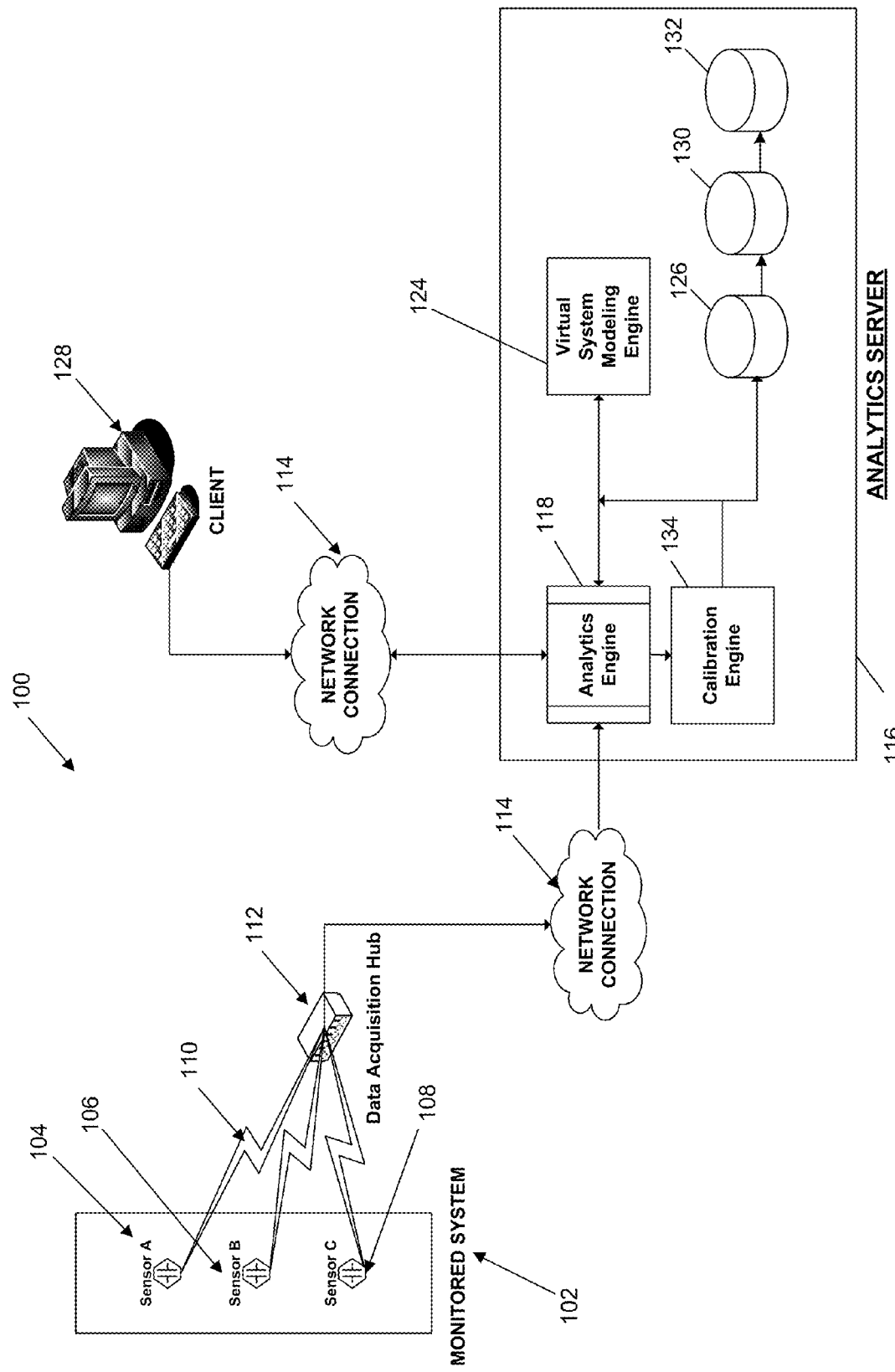
FIG. 1 is an illustration of a system for utilizing real-time data for predictive analysis of the performance of a monitored system, in accordance with one embodiment.

FIG. 1 is an illustration of a system for utilizing real-time data for predictive analysis of the performance of a monitored system, in accordance with one embodiment. As shown herein, the system 100 includes a series of sensors, i.e., Sensor A 104, Sensor B 106, Sensor C 108, interfaced with the various components of a monitored system 102, a data acquisition hub 112, an analytics server 116, and a thin-client device 128. In one embodiment, the monitored system 102 is an electrical power generation plant. In another embodiment, the monitored system 102 is an electrical power transmission infrastructure. In still another embodiment, the monitored system 102 is an electrical power distribution system. In still another embodiment, the monitored system 102 includes a combination of one or more electrical power generation plant(s), power transmission infrastructure(s), and/or an electrical power distribution system. It should be understood that the monitored system 102 can be any combination of components whose operations can be monitored with conventional sensors and where each component interacts with or is related to at least one other component within the combination. For a monitored system 102 that is an electrical power generation, transmission, or distribution system, the sensors can provide data such as voltage, frequency, current, power, power factor, and the like.

The sensors 104, 106 and 108 can be configured to provide output values for system parameters that indicate the operational status and/or "health" of the monitored system 102. For example, in an electrical power generation system, the current output or voltage readings for the various components that comprise the power generation system is indicative of the overall health and/or operational condition of the system. In one embodiment, the sensors are configured to also measure additional data that can affect system operation. For example, for an electrical power distribution system, the sensor output can include environmental information, e.g., temperature, humidity, etc., which can impact electrical power demand and can also affect the operation and efficiency of the power distribution system itself.

Continuing with FIG. 1, in one embodiment, the sensors 104, 106 and 108 can be configured to output data in an analog format. For example, electrical power sensor measurements, e.g., voltage, current, etc., are sometimes conveyed in an analog format as the measurements may be continuous in both time and amplitude. In another embodiment, the sensors 104, 106 and 108 can be configured to output data in a digital format. For example, the same electrical power sensor measurements can be taken in discrete time increments that are not continuous in time or amplitude. In still another embodiment, the sensors 104, 106 and 108 can be configured to output data in either an analog format, digital format, or both, depending on the sampling requirements of the monitored system 102.

The sensors 104, 106 and 108 can be configured to capture output data at split-second intervals to effectuate "real time" data capture. For example, in one embodiment, the sensors 104, 106 and 108 can be configured to generate hundreds of thousands of data readings per second. It should be appreciated, however, that the number of data output readings taken by a particular sensor can be set to any value as long as the operational limits of the sensor and the data processing capabilities of the data acquisition hub 112 are not exceeded.

Still referring to FIG. 1, each sensor 104, 106 and 108 can be communicatively connected to the data acquisition hub 112 via an analog or digital data connection 110. The data acquisition hub 112 can be a standalone unit or integrated within the analytics server 116 and can be embodied as a piece of hardware, software, or some combination thereof. In one embodiment, the data connection 110 is a "hard wired" physical data connection, e.g., serial, network, etc. For example, a serial or parallel cable connection between the sensor and the hub 112. In another embodiment, the data connection 110 is a wireless data connection. For example, a radio frequency (RF), BLUETOOTH™, infrared or equivalent connection between the sensor and the hub 112.

The data acquisition hub 112 can be configured to communicate "real-time" data from the monitored system 102 to the analytics server 116 using a network connection 114. In one embodiment, the network connection 114 is a "hardwired" physical connection. For example, the data acquisition hub 112 can be communicatively connected, e.g., via Category 5 (CAT5), fiber optic, or equivalent cabling, to a data server (not shown) that is communicatively connected, e.g., via CAT5, fiber optic, or equivalent cabling, through the Internet and to the analytics server 116 server. The analytics server 116 can also be communicatively connected with the Internet, e.g., via CAT5, fiber optic, or equivalent cabling. In another embodiment, the network connection 114 can be a wireless network connection, e.g., Wi-Fi, WLAN, etc. For example, utilizing an 802.11b/g or equivalent transmission format. In practice, the network connection used is dependent upon the particular requirements of the monitored system 102.

Data acquisition hub 112 can also be configured to supply warning and alarms signals as well as control signals to monitored system 102 and/or sensors 104, 106, and 108 as described in more detail below.

As shown in FIG. 1, in one embodiment, the analytics server 116 can host an analytics engine 118, virtual system modeling engine 124, and several databases 126, 130, and 132. The virtual system modeling engine 124 can, e.g., be a computer modeling system, such as described above. In this context, however, the modeling engine 124 can be used to precisely model and mirror the actual electrical system. Analytics engine 118 can be configured to generate predicted data for the monitored system and analyze difference between the predicted data and the real-time data received from hub 112.

Figure 2:
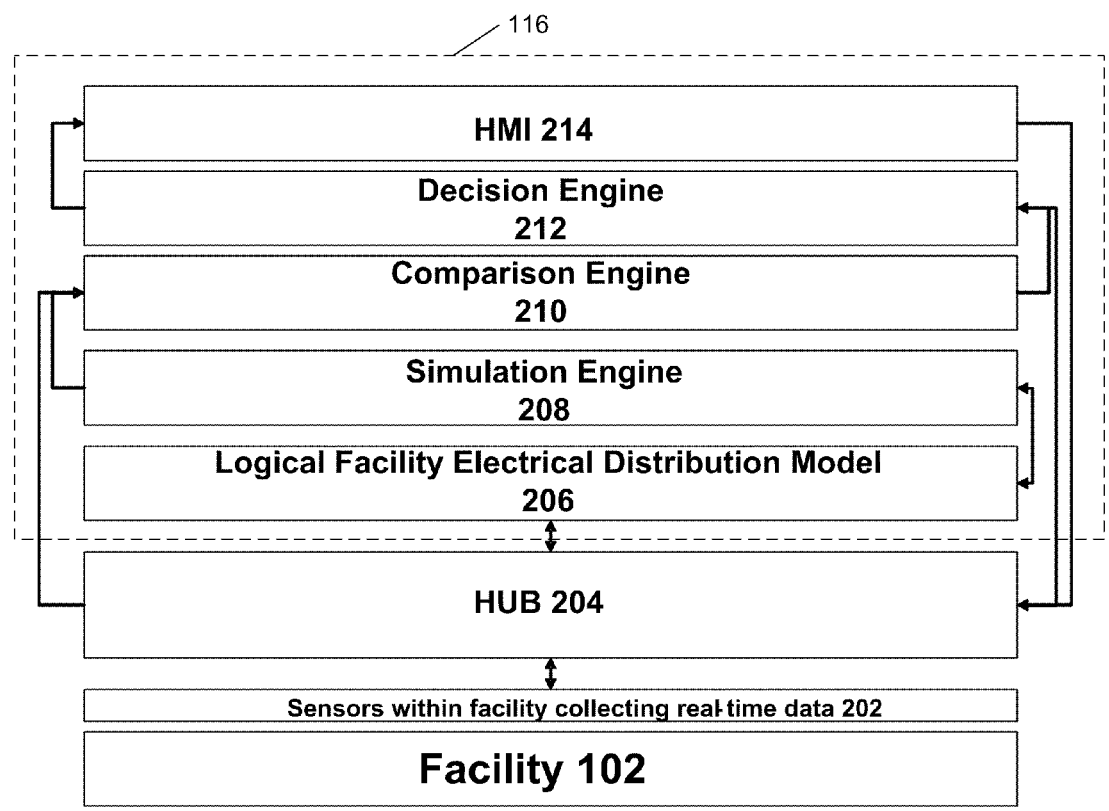
FIG. 2 is a diagram illustrating a detailed view of an analytics server included in the system of FIG. 1.

FIG. 2 is a diagram illustrating a more detailed view of analytic server 116. As can be seen, analytic server 116 is interfaced with a monitored facility 102 via sensors 202, e.g., sensors 104, 106, and 108. Sensors 202 are configured to supply real-time data from within monitored facility 102. The real-time data is communicated to analytic server 116 via a hub 204. Hub 204 can be configured to provide real-time data to server 116 as well as alarming, sensing, and control features for facility 102.

The real-time data from hub 204 can be passed to a comparison engine 210, which can form part of analytics engine 118. Comparison engine 210 can be configured to continuously compare the real-time data with predicted values generated by simulation engine 208. Based on the comparison, comparison engine 210 can be further configured to determine whether deviations between the real-time and the expected values exists, and if so to classify the deviation, e.g., high, marginal, low, etc. The deviation level can then be communicated to decision engine 212, which can also comprise part of analytics engine 118.

Decision engine 212 can be configured to look for significant deviations between the predicted values and real-time values as received from the comparison engine 210. If significant deviations are detected, decision engine 212 can also be configured to determine whether an alarm condition exists, activate the alarm and communicate the alarm to Human-Machine Interface (HMI) 214 for display in real-time via, e.g., thin client 128. Decision engine 212 can also be configured to perform root cause analysis for significant deviations in order to determine the interdependencies and identify the parent-child failure relationships that may be occurring. In this manner, parent alarm conditions are not drowned out by multiple children alarm conditions, allowing the user/operator to focus on the main problem, at least at first.

Thus, in one embodiment, and alarm condition for the parent can be displayed via HMI 214 along with an indication that processes and equipment dependent on the parent process or equipment are also in alarm condition. This also means that server 116 can maintain a parent-child logical relationship between processes and equipment comprising facility 102. Further, the processes can be classified as critical, essential, non-essential, etc.

Decision engine 212 can also be configured to determine health and performance levels and indicate these levels for the various processes and equipment via HMI 214. All of which, when combined with the analytic capabilities of analytics engine 118 allows the operator to minimize the risk of catastrophic equipment failure by predicting future failures and providing prompt, informative information concerning potential/predicted failures before they occur. Avoiding catastrophic failures reduces risk and cost, and maximizes facility performance and up time.

Simulation engine 208 operates on complex logical models 206 of facility 102. These models are continuously and automatically synchronized with the actual facility status based on the real-time data provided by hub 204. In other words, the models are updated based on current switch status, breaker status, e.g., open-closed, equipment on/off status, etc. Thus, the models are automatically updated based on such status, which allows simulation engine to produce predicted data based on the current facility status. This in turn, allows accurate and meaningful comparisons of the real-time data to the predicted data.

Example models 206 that can be maintained and used by server 116 include power flow models used to calculate expected kW, kVAR, power factor values, etc., short circuit models used to calculate maximum and minimum available fault currents, protection models used to determine proper protection schemes and ensure selective coordination of protective devices, power quality models used to determine voltage and current distortions at any point in the network, to name just a few. It will be understood that different models can be used depending on the system being modeled.

In certain embodiments, hub 204 is configured to supply equipment identification associated with the real-time data. This identification can be cross referenced with identifications provided in the models.

In one embodiment, if the comparison performed by comparison engine 210 indicates that the differential between the real-time sensor output value and the expected value exceeds a Defined Difference Tolerance (DDT) value, i.e., the "real-time" output values of the sensor output do not indicate an alarm condition, but below an alarm condition, i.e., alarm threshold value, a calibration request is generated by the analytics engine 118. If the differential exceeds the alarm condition, an alarm or notification message can be generated by the analytics engine 118. If the differential is below the DTT value, the analytics engine can do nothing and continues to monitor the real-time data and expected data.

In one embodiment, the alarm or notification message can be sent directly to the client or user) 128, e.g., via HMI 214, for display in real-time on a web browser, pop-up message box, e-mail, or equivalent on the client 128 display panel. In another embodiment, the alarm or notification message can be sent to a wireless mobile device, e.g., BLACKBERRY™, laptop, pager, etc., to be displayed for the user by way of a wireless router or equivalent device interfaced with the analytics server 116. In still another embodiment, the alarm or notification message can be sent to both the client 128 display and the wireless mobile device. The alarm can be indicative of a need for a repair event or maintenance to be done on the monitored system. It should be noted, however, that calibration requests should not be allowed if an alarm condition exists to prevent the models from being calibrated to an abnormal state.

Once the calibration is generated by the analytics engine 118, the various operating parameters or conditions of model(s) 206 can be updated or adjusted to reflect the actual facility configuration. This can include, but is not limited to, modifying the predicted data output from the simulation engine 208, adjusting the logic/processing parameters used by the model(s) 206, adding/subtracting functional elements from model(s) 206, etc. It should be understood that any operational parameter used by models 206 can be modified as long as the resulting modifications can be processed and registered by simulation engine 208.

Referring back to FIG. 1, models 206 can be stored in the virtual system model database 126. As noted, a variety of conventional virtual model applications can be used for creating a virtual system model, so that a wide variety of systems and system parameters can be modeled. For example, in the context of an electrical power distribution system, the virtual system model can include components for modeling reliability, modeling voltage stability, and modeling power flow. In addition, models 206 can include dynamic control logic that permits a user to configure the models 206 by specifying control algorithms and logic blocks in addition to combinations and interconnections of generators, governors, relays, breakers, transmission line, and the like. The voltage stability parameters can indicate capacity in terms of size, supply, and distribution, and can indicate availability in terms of remaining capacity of the presently configured system. The power flow model can specify voltage, frequency, and power factor, thus representing the "health" of the system.

All of models 206 can be referred to as a virtual system model. Thus, a virtual system model database 130 can be configured to store the virtual system model. A duplicate, but synchronized copy of the virtual system model can be stored in a virtual simulation model database 130. This duplicate model can be used for what-if simulations. In other words, this model can be used to allow a system designer to make hypothetical changes to the facility and test the resulting effect, without taking down the facility or costly and time consuming analysis. Such hypothetical can be used to learn failure patterns and signatures as well as to test proposed modifications, upgrades, additions, etc., for the facility. The real-time data, as well as trending produced by analytics engine 118 can be stored in a real-time data acquisition database 132.

As discussed above, the virtual system model is periodically calibrated and synchronized with "real-time" sensor data outputs so that the virtual system model provides data output values that are consistent with the actual "real-time" values received from the sensor output signals. Unlike conventional systems that use virtual system models primarily for system design and implementation purposes, i.e., offline simulation and facility planning, the virtual system models described herein are updated and calibrated with the real-time system operational data to provide better predictive output values. A divergence between the real-time sensor output values and the predicted output values generate either an alarm condition for the values in question and/or a calibration request that is sent to the calibration engine 134.

Continuing with FIG. 1, the analytics engine 118 can be configured to implement pattern/sequence recognition into a real-time decision loop that, e.g., is enabled by a new type of machine learning called associative memory, or hierarchical temporal memory (HTM), which is a biological approach to learning and pattern recognition. Associative memory allows storage, discovery, and retrieval of learned associations between extremely large numbers of attributes in real time. At a basic level, an associative memory stores information about how attributes and their respective features occur together. The predictive power of the associative memory technology comes from its ability to interpret and analyze these co-occurrences and to produce various metrics. Associative memory is built through "experiential" learning in which each newly observed state is accumulated in the associative memory as a basis for interpreting future events. Thus, by observing normal system operation over time, and the normal predicted system operation over time, the associative memory is able to learn normal patterns as a basis for identifying non-normal behavior and appropriate responses, and to associate patterns with particular outcomes, contexts or responses. The analytics engine 118 is also better able to understand component mean time to failure rates through observation and system availability characteristics. This technology in combination with the virtual system model can be characterized as a "neocortical" model of the system under management This approach also presents a novel way to digest and comprehend alarms in a manageable and coherent way. The neocortical model could assist in uncovering the patterns and sequencing of alarms to help pinpoint the location of the (impending) failure, its context, and even the cause. Typically, responding to the alarms is done manually by experts who have gained familiarity with the system through years of experience. However, at times, the amount of information is so great that an individual cannot respond fast enough or does not have the necessary expertise. An "intelligent" system like the neocortical system that observes and recommends possible responses could improve the alarm management process by either supporting the existing operator, or even managing the system autonomously.

Current simulation approaches for maintaining transient stability involve traditional numerical techniques and typically do not test all possible scenarios. The problem is further complicated as the numbers of components and pathways increase. Through the application of the neocortical model, by observing simulations of circuits, and by comparing them to actual system responses, it may be possible to improve the simulation process, thereby improving the overall design of future circuits.

The virtual system model database 126, as well as databases 130 and 132, can be configured to store one or more virtual system models, virtual simulation models, and real-time data values, each customized to a particular system being monitored by the analytics server 118. Thus, the analytics server 118 can be used to monitor more than one system at a time. As depicted herein, the databases 126, 130, and 132 can be hosted on the analytics server 116 and communicatively interfaced with the analytics engine 118. In other embodiments, databases 126, 130, and 132 can be hosted on a separate database server (not shown) that is communicatively connected to the analytics server 116 in a manner that allows the virtual system modeling engine 124 and analytics engine 118 to access the databases as needed.

Therefore, in one embodiment, the client 128 can modify the virtual system model stored on the virtual system model database 126 by using a virtual system model development interface using well-known modeling tools that are separate from the other network interfaces. For example, dedicated software applications that run in conjunction with the network interface to allow a client 128 to create or modify the virtual system models.

The client 128 can use a variety of network interfaces, e.g., web browser, CITRIX™, WINDOWS TERMINAL SERVICES™, telnet, or other equivalent thin-client terminal applications, etc., to access, configure, and modify the sensors, e.g., configuration files, etc., analytics engine 118, e.g., configuration files, analytics logic, etc., calibration parameters, e.g., configuration files, calibration parameters, etc., virtual system modeling engine 124, e.g., configuration files, simulation parameters, etc., and virtual system model of the system under management, e.g., virtual system model operating parameters and configuration files. Correspondingly, data from those various components of the monitored system 102 can be displayed on a client 128 display panel for viewing by a system administrator or equivalent.

Figure 3:
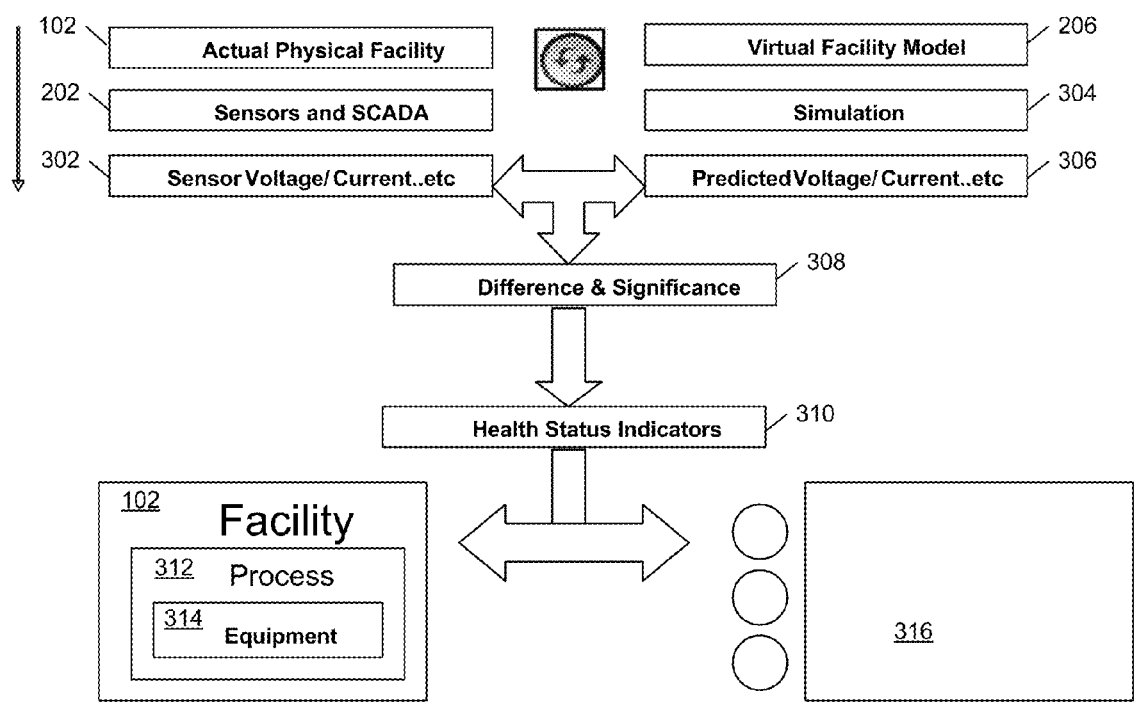
FIG. 3 is a diagram illustrating how the system of FIG. 1 operates to synchronize the operating parameters between a physical facility and a virtual system model of the facility.

As described above, server 116 is configured to synchronize the physical world with the virtual and report, e.g., via visual, real-time display, deviations between the two as well as system health, alarm conditions, predicted failures, etc. This is illustrated with the aid of FIG. 3, in which the synchronization of the physical world (left side) and virtual world (right side) is illustrated. In the physical world, sensors 202 produce real-time data 302 for the processes 312 and equipment 314 that make up facility 102. In the virtual world, simulations 304 of the virtual system model 206 provide predicted values 306, which are correlated and synchronized with the real-time data 302. The real-time data can then be compared to the predicted values so that differences 308 can be detected. The significance of these differences can be determined to determine the health status 310 of the system. The health stats can then be communicated to the processes 312 and equipment 314, e.g., via alarms and indicators, as well as to thin client 128, e.g., via web pages 316.

Figure 4:
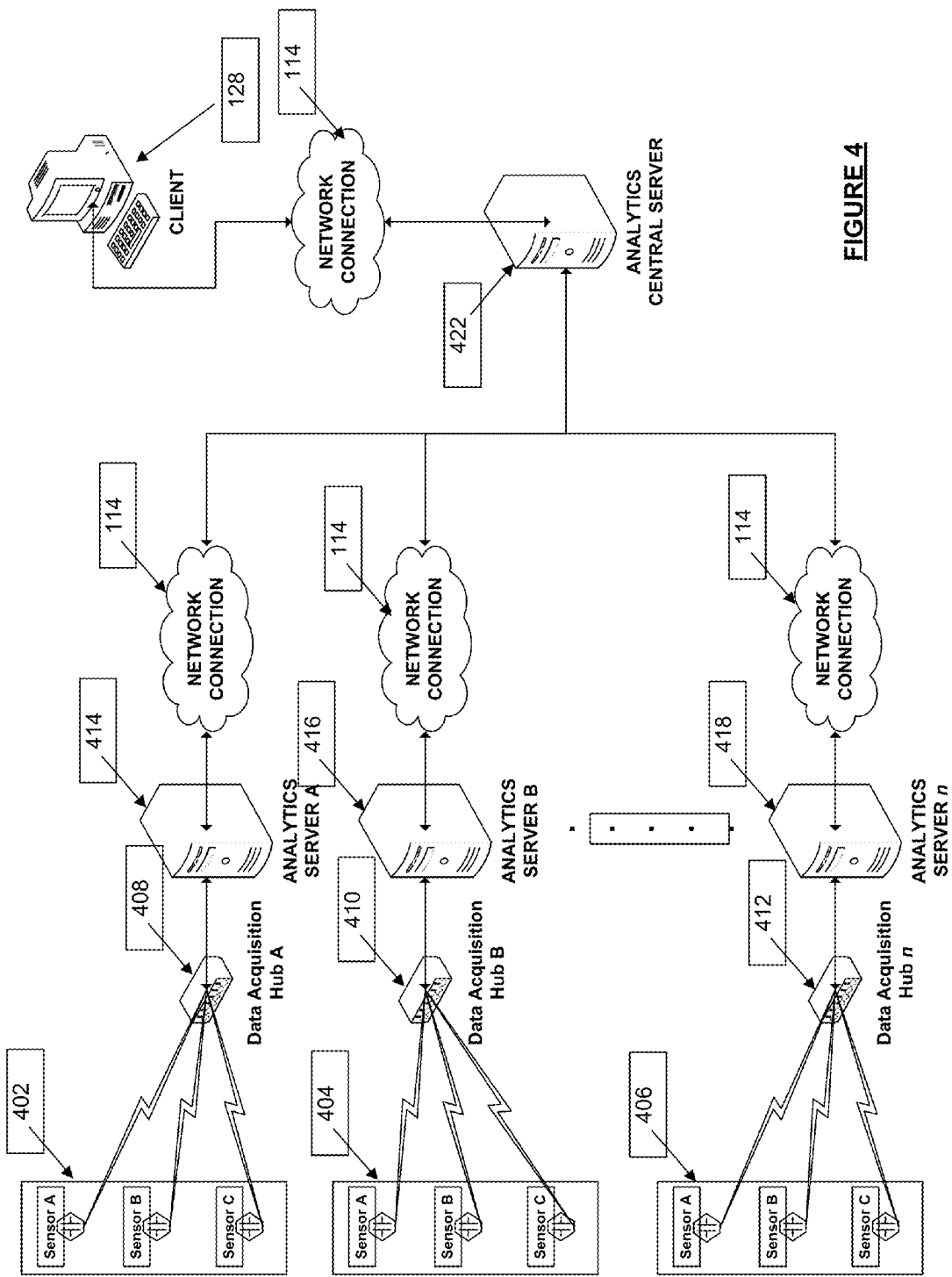
FIG. 4 is an illustration of the scalability of a system for utilizing real-time data for predictive analysis of the performance of a monitored system, in accordance with one embodiment.

FIG. 4 is an illustration of the scalability of a system for utilizing real-time data for predictive analysis of the performance of a monitored system, in accordance with one embodiment. As depicted herein, an analytics central server 422 is communicatively connected with analytics server A 414, analytics server B 416, and analytics server n 418, i.e., one or more other analytics servers, by way of one or more network connections 114. Each of the analytics servers 414, 416, and 418 is communicatively connected with a respective data acquisition hub, i.e., Hub A 408, Hub B 410, Hub n 412, which communicates with one or more sensors that are interfaced with a system, i.e., Monitored System A 402, Monitored System B 404, Monitored System n 406, which the respective analytical server monitors. For example, analytics server A 414 is communicative connected with data acquisition hub A 408, which communicates with one or more sensors interfaced with monitored system A 402.

Each analytics server, i.e., analytics server A 414, analytics server B 416, analytics server n 418, can be configured to monitor the sensor output data of its corresponding monitored system and feed that data to the central analytics server 422. Additionally, each of the analytics servers 414, 416 and 418 can function as a proxy agent of the central analytics server 422 during the modifying and/or adjusting of the operating parameters of the system sensors they monitor. For example, analytics server B 416 can be configured as a proxy to modify the operating parameters of the sensors interfaced with monitored system B 404.

Moreover, the central analytics server 422, which is communicatively connected to one or more analytics server(s), can be used to enhance the scalability. For example, a central analytics server 422 can be used to monitor multiple electrical power generation facilities, i.e., monitored system A 402 can be a power generation facility located in city A while monitored system B 404 is a power generation facility located in city B, on an electrical power grid. In this example, the number of electrical power generation facilities that can be monitored by central analytics server 422 is limited only by the data processing capacity of the central analytics server 422. The central analytics server 422 can be configured to enable a client 128 to modify and adjust the operational parameters of any the analytics servers communicatively connected to the central analytics server 422. Furthermore, as discussed above, each of the analytics servers 414, 416 and 418 can be configured to serve as proxies for the central analytics server 422 to enable a client 128 to modify and/or adjust the operating parameters of the sensors interfaced with the systems that they respectively monitor. For example, the client 128 can use the central analytics server 422, and vice versa, to modify and/or adjust the operating parameters of analytics server A 414 and use the same to modify and/or adjust the operating parameters of the sensors interfaced with monitored system A 402. Additionally, each of the analytics servers can be configured to allow a client 128 to modify the virtual system model through a virtual system model development interface using well-known modeling tools.

In one embodiment, the central analytics server 422 can function to monitor and control a monitored system when its corresponding analytics server is out of operation. For example, central analytics server 422 can take over the functionality of analytics server B 416 when the server 416 is out of operation. That is, the central analytics server 422 can monitor the data output from monitored system B 404 and modify and/or adjust the operating parameters of the sensors that are interfaced with the system 404.

In one embodiment, the network connection 114 is established through a wide area network (WAN) such as the Internet. In another embodiment, the network connection is established through a local area network (LAN) such as the company intranet. In a separate embodiment, the network connection 114 is a "hardwired" physical connection. For example, the data acquisition hub 112 can be communicatively connected, e.g., via Category 5 (CAT5), fiber optic, or equivalent cabling, to a data server that is communicatively connected, e.g., via CAT5, fiber optic, or equivalent cabling, through the Internet and to the analytics server 116 server hosting the analytics engine 118. In another embodiment, the network connection 114 is a wireless network connection, e.g., Wi-Fi, WLAN, etc. For example, utilizing an 802.11b/g or equivalent transmission format.

In certain embodiments, regional analytics servers can be placed between local analytics servers 414, 416, 418 and central analytics server 422. Further, in certain embodiments a disaster recovery site can be included at the central analytics server 422 level.

Figure 5:
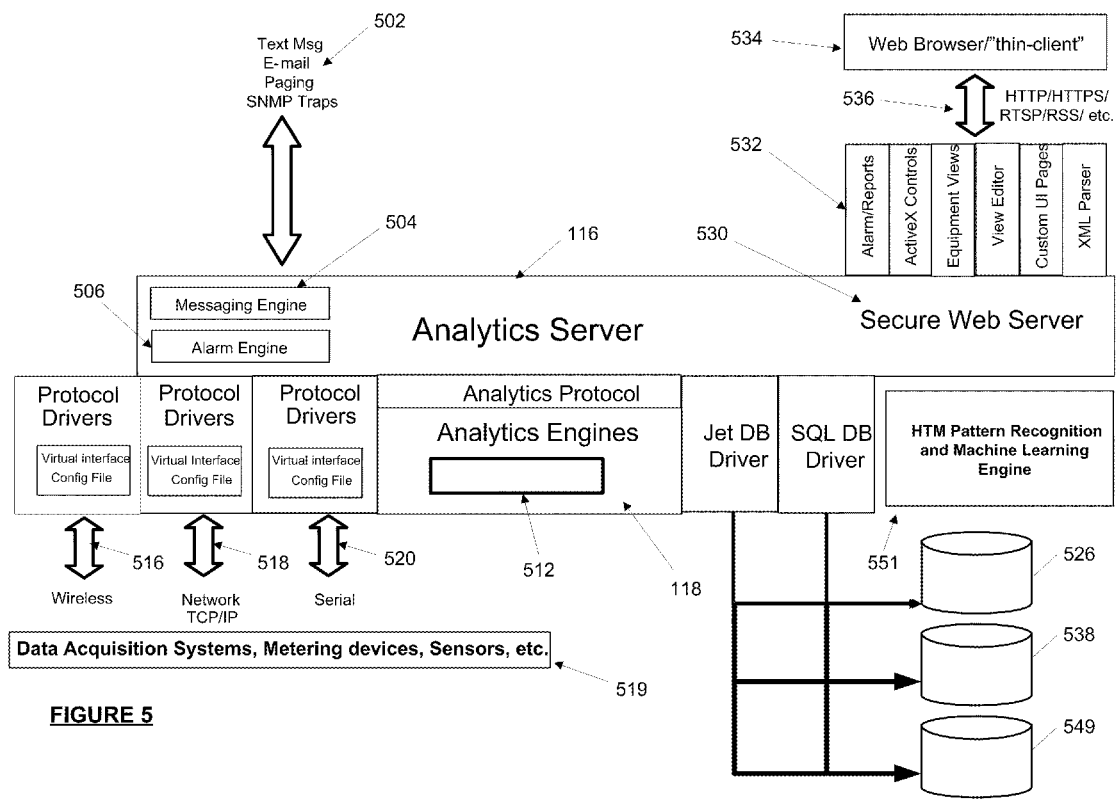
FIG. 5 is a block diagram that shows the configuration details of the system illustrated in FIG. 1, in accordance with one embodiment.

FIG. 5 is a block diagram that shows the configuration details of analytics server 116 illustrated in FIG. 1 in more detail. It should be understood that the configuration details in FIG. 5 are merely one embodiment of the items described for FIG. 1, and it should be understood that alternate configurations and arrangements of components could also provide the functionality described herein.

The analytics server 116 includes a variety of components. In the example of FIG. 5, the analytics server 116 is implemented in a Web-based configuration, so that the analytics server 116 includes, or communicates with, a secure web server 530 for communication with the sensor systems 519, e.g., data acquisition units, metering devices, sensors, etc., and external communication entities 534, e.g., web browser, "thin client" applications, etc. A variety of user views and functions 532 are available to the client 128 such as: alarm reports, Active X controls, equipment views, view editor tool, custom user interface page, and XML parser. It should be appreciated, however, that these are just examples of a few in a long list of views and functions 532 that the analytics server 116 can deliver to the external communications entities 534 and are not meant to limit the types of views and functions 532 available to the analytics server 116 in any way.

The analytics server 116 also includes an alarm engine 506 and messaging engine 504, for the aforementioned external communications. The alarm engine 506 is configured to work in conjunction with the messaging engine 504 to generate alarm or notification messages 502, in the form of text messages, e-mails, paging, etc., in response to the alarm conditions previously described. The analytics server 116 determines alarm conditions based on output data it receives from the various sensor systems 519 through a communications connection, e.g., wireless 516, TCP/IP 518, Serial 520, etc., and simulated output data from a virtual system model 512, of the monitored system, processed by the analytics engines 118. In one embodiment, the virtual system model 512 can be created by a user through interacting with an external communication entity 534 by specifying the components that comprise the monitored system and by specifying relationships between the components of the monitored system. In another embodiment, the virtual system model 512 can be automatically generated by the analytics engines 118 as components of the monitored system are brought online and interfaced with the analytics server 508.

Continuing with FIG. 5, a virtual system model database 526 can be communicatively connected with the analytics server 116 and can be configured to store one or more virtual system models 512, each of which represents a particular monitored system. For example, the analytics server 116 can conceivably monitor multiple electrical power generation systems, e.g., system A, system B, system C, etc., spread across a wide geographic area, e.g., City A, City B, City C, etc. Therefore, the analytics server 116 can use a different virtual system model 512 for each of the electrical power generation systems that it monitors. Virtual simulation model database 538 can be configured to store a synchronized, duplicate copy of the virtual system model 512, and real-time data acquisition database 540 can store the real-time and trending data for the system(s) being monitored.

Thus, in operation, analytics server 116 can receive real-time data for various sensors, i.e., components, through data acquisition system 202. As can be seen, analytics server 116 can comprise various drivers configured to interface with the various types of sensors, etc., comprising data acquisition system 202. This data represents the real-time operational data for the various components. For example, the data can indicate that a certain component is operating at a certain voltage level and drawing certain amount of current. This information can then be fed to a modeling engine to generate a virtual system model 512 that is based on the actual real-time operational data.

Analytics engine 118 can be configured to compare predicted data based on the virtual system model 512 with real-time data received from data acquisition system 202 and to identify any differences. In some instances, analytics engine can be configured to identify these differences and then update, i.e., calibrate, the virtual system model 512 for use in future comparisons. In this manner, more accurate comparisons and warnings can be generated.

But in other instances, the differences will indicate a failure, or the potential for a failure. For example, when a component begins to fail, the operating parameters will begin to change. This change may be sudden or it may be a progressive change over time. Analytics engine 118 can detect such changes and issue warnings that can allow the changes to be detected before a failure occurs. The analytic engine 118 can be configured to generate warnings that can be communicated via interface 532.

For example, a user can access information from server 116 using thin client 534. For example, reports can be generate and served to thin client 534 via server 540. These reports can, for example, comprise schematic or symbolic illustrations of the system being monitored. Status information for each component can be illustrated or communicated for each component. This information can be numerical, i.e., the voltage or current level, or it can be symbolic, i.e., green for normal, red for failure or warning. In certain embodiments, intermediate levels of failure can also be communicated, i.e., yellow can be used to indicate operational conditions that project the potential for future failure. It should be noted that this information can be accessed in real-time. Moreover, via thin client 534, the information can be accessed from anywhere and anytime.

Continuing with FIG. 5, the Analytics Engine 118 is communicatively interfaced with a HTM pattern recognition and machine learning engine 551. The HTM engine 551 can be configured to work in conjunction with the analytics engine 118 and a virtual system model of the monitored system to make real-time predictions, i.e., forecasts, about various operational aspects of the monitored system. The HTM engine 551 works by processing and storing patterns observed during the normal operation of the monitored system over time. These observations are provided in the form of real-time data captured using a multitude of sensors that are imbedded within the monitored system. In one embodiment, the virtual system model can also be updated with the real-time data such that the virtual system model "ages" along with the monitored system. Examples of a monitored system can include machinery, factories, electrical systems, processing plants, devices, chemical processes, biological systems, data centers, aircraft carriers, and the like. It should be understood that the monitored system can be any combination of components whose operations can be monitored with conventional sensors and where each component interacts with or is related to at least one other component within the combination.

Figure 6:
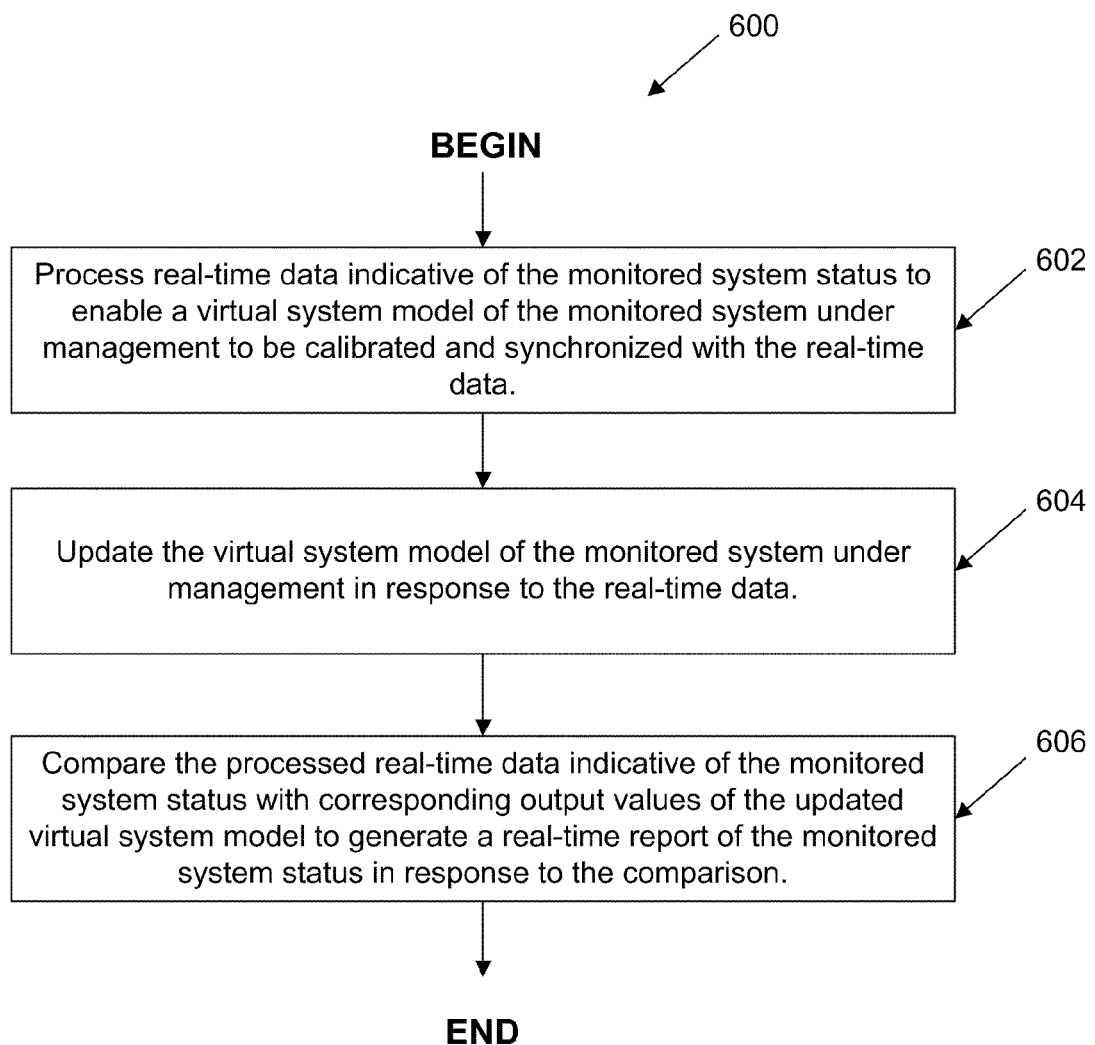
FIG. 6 is an illustration of a flowchart describing a method for real-time monitoring and predictive analysis of a monitored system, in accordance with one embodiment.

FIG. 6 is a flowchart describing a method for real-time monitoring and predictive analysis of a monitored system, in accordance with one embodiment. Method 600 begins with operation 602 where real-time data indicative of the monitored system status is processed to enable a virtual model of the monitored system under management to be calibrated and synchronized with the real-time data. In one embodiment, the monitored system 102 is a mission critical electrical power system. In another embodiment, the monitored system 102 can include an electrical power transmission infrastructure. In still another embodiment, the monitored system 102 includes a combination of thereof. It should be understood that the monitored system 102 can be any combination of components whose operations can be monitored with conventional sensors and where each component interacts with or is related to at least one other component within the combination.

Method 600 moves on to operation 604 where the virtual system model of the monitored system under management is updated in response to the real-time data. This may include, but is not limited to, modifying the simulated data output from the virtual system model, adjusting the logic/processing parameters utilized by the virtual system modeling engine to simulate the operation of the monitored system, adding/subtracting functional elements of the virtual system model, etc. It should be understood, that any operational parameter of the virtual system modeling engine and/or the virtual system model may be modified by the calibration engine as long as the resulting modifications can be processed and registered by the virtual system modeling engine.

Method 600 proceeds on to operation 606 where the simulated real-time data indicative of the monitored system status is compared with a corresponding virtual system model created at the design stage. The design stage models, which may be calibrated and updated based on real-time monitored data, are used as a basis for the predicted performance of the system. The real-time monitored data can then provide the actual performance over time. By comparing the real-time time data with the predicted performance information, difference can be identified a tracked by, e.g., the analytics engine 118. Analytics engines 118 can then track trends, determine alarm states, etc., and generate a real-time report of the system status in response to the comparison.

In other words, the analytics can be used to analyze the comparison and real-time data and determine if there is a problem that should be reported and what level the problem may be, e.g., low priority, high priority, critical, etc. The analytics can also be used to predict future failures and time to failure, etc. In one embodiment, reports can be displayed on a conventional web browser (e.g. INTERNET EXPLORER™, FIREFOX™, NETSCAPE™, etc., which can be rendered on a standard personal computing (PC) device. In another embodiment, the "real-time" report can be rendered on a "thin-client" computing device, e.g., CITRIX™, WINDOWS TERMINAL SERVICES™, telnet, or other equivalent thin-client terminal application. In still another embodiment, the report can be displayed on a wireless mobile device, e.g., BLACKBERRY™, laptop, pager, etc. For example, in one embodiment, the "real-time" report can include such information as the differential in a particular power parameter, i.e., current, voltage, etc., between the real-time measurements and the virtual output data.

Figure 7:
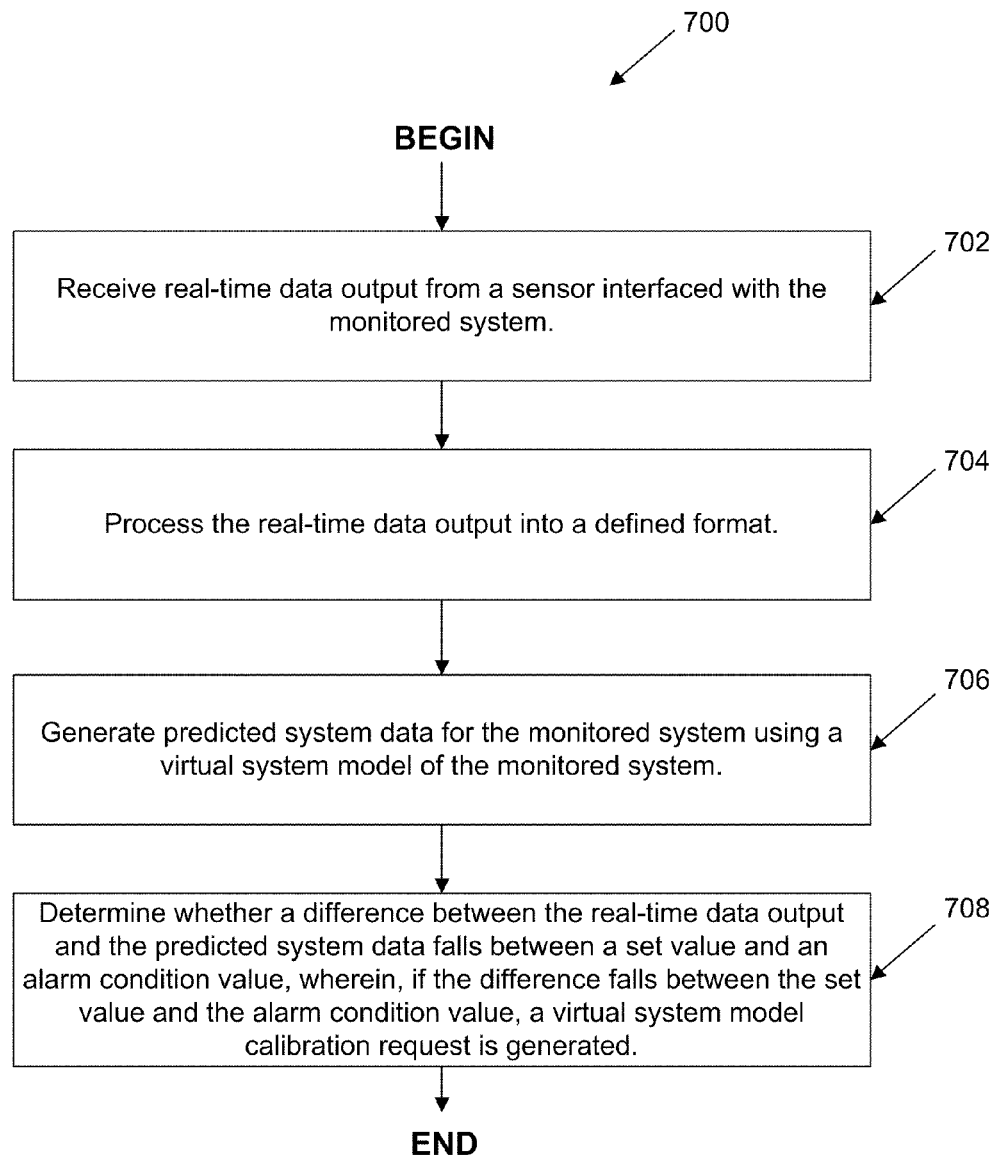
FIG. 7 is an illustration of a flowchart describing a method for managing real-time updates to a virtual system model of a monitored system, in accordance with one embodiment.

FIG. 7 is a flowchart describing a method for managing real-time updates to a virtual system model of a monitored system, in accordance with one embodiment. Method 700 begins with operation 702 where real-time data output from a sensor interfaced with the monitored system is received. The sensor is configured to capture output data at split-second intervals to effectuate "real time" data capture. For example, in one embodiment, the sensor is configured to generate hundreds of thousands of data readings per second. It should be appreciated, however, that the number of data output readings taken by the sensor may be set to any value as long as the operational limits of the sensor and the data processing capabilities of the data acquisition hub are not exceeded.

Method 700 moves to operation 704 where the real-time data is processed into a defined format. This would be a format that can be used by the analytics server to analyze or compare the data with the simulated data output from the virtual system model. In one embodiment, the data is converted from an analog signal to a digital signal. In another embodiment, the data is converted from a digital signal to an analog signal. It should be understood, however, that the real-time data may be processed into any defined format as long as the analytics engine can utilize the resulting data in a comparison with simulated output data from a virtual system model of the monitored system.

Method 700 continues on to operation 706 where the predicted, i.e., simulated, data for the monitored system is generated using a virtual system model of the monitored system. As discussed above, a virtual system modeling engine uses dynamic control logic stored in the virtual system model to generate the predicted output data. The predicted data is supposed to be representative of data that should actually be generated and output from the monitored system.

Method 700 proceeds to operation 708 where a determination is made as to whether the difference between the real-time data output and the predicted system data falls between a set value and an alarm condition value, where if the difference falls between the set value and the alarm condition value a virtual system model calibration and a response can be generated. That is, if the comparison indicates that the differential between the "real-time" sensor output value and the corresponding "virtual" model data output value exceeds a Defined Difference Tolerance (DDT) value, i.e., the "real-time" output values of the sensor output do not indicate an alarm condition, but below an alarm condition, i.e., alarm threshold value, a response can be generated by the analytics engine. In one embodiment, if the differential exceeds, the alarm condition, an alarm or notification message is generated by the analytics engine 118. In another embodiment, if the differential is below the DTT value, the analytics engine does nothing and continues to monitor the "real-time" data and "virtual" data. Generally speaking, the comparison of the set value and alarm condition is indicative of the functionality of one or more components of the monitored system.

Figure 8:
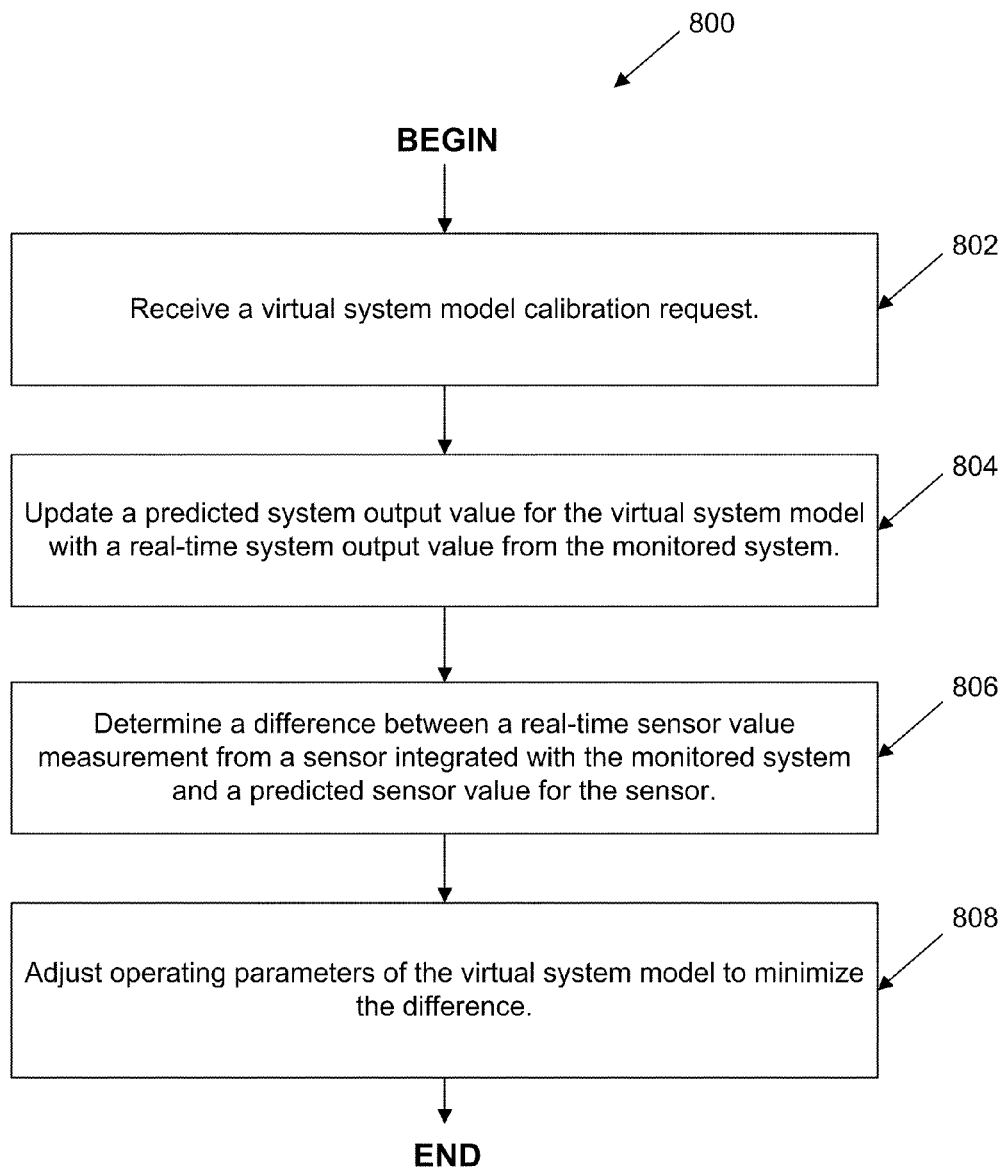
FIG. 8 is an illustration of a flowchart describing a method for synchronizing real-time system data with a virtual system model of a monitored system, in accordance with one embodiment.

FIG. 8 is a flowchart describing a method for synchronizing real-time system data with a virtual system model of a monitored system, in accordance with one embodiment. Method 800 begins with operation 802 where a virtual system model calibration request is received. A virtual model calibration request can be generated by an analytics engine whenever the difference between the real-time data output and the predicted system data falls between a set value and an alarm condition value.

Method 800 proceeds to operation 804 where the predicted system output value for the virtual system model is updated with a real-time output value for the monitored system. For example, if sensors interfaced with the monitored system outputs a real-time current value of A, then the predicted system output value for the virtual system model is adjusted to reflect a predicted current value of A.

Method 800 moves on to operation 806 where a difference between the real-time sensor value measurement from a sensor integrated with the monitored system and a predicted sensor value for the sensor is determined. As discussed above, the analytics engine is configured to receive "real-time" data from sensors interfaced with the monitored system via the data acquisition hub, or, alternatively directly from the sensors, and "virtual" data from the virtual system modeling engine simulating the data output from a virtual system model of the monitored system. In one embodiment, the values are in units of electrical power output, i.e., current or voltage, from an electrical power generation or transmission system. It should be appreciated, however, that the values can essentially be any unit type as long as the sensors can be configured to output data in those units or the analytics engine can convert the output data received from the sensors into the desired unit type before performing the comparison.

Method 800 continues on to operation 808 where the operating parameters of the virtual system model are adjusted to minimize the difference. This means that the logic parameters of the virtual system model that a virtual system modeling engine uses to simulate the data output from actual sensors interfaced with the monitored system are adjusted so that the difference between the real-time data output and the simulated data output is minimized. Correspondingly, this operation will update and adjust any virtual system model output parameters that are functions of the virtual system model sensor values. For example, in a power distribution environment, output parameters of power load or demand factor might be a function of multiple sensor data values. The operating parameters of the virtual system model that mimic the operation of the sensor will be adjusted to reflect the real-time data received from those sensors. In one embodiment, authorization from a system administrator is requested prior to the operating parameters of the virtual system model being adjusted. This is to ensure that the system administrator is aware of the changes that are being made to the virtual system model. In one embodiment, after the completion of all the various calibration operations, a report is generated to provide a summary of all the adjustments that have been made to the virtual system model.

As described above, virtual system modeling engine 124 can be configured to model various aspects of the system to produce predicted values for the operation of various components within monitored system 102. These predicted values can be compared to actual values being received via data acquisition hub 112. If the differences are greater than a certain threshold, e.g., the DTT, but not in an alarm condition, then a calibration instruction can be generated. The calibration instruction can cause a calibration engine 134 to update the virtual model being used by system modeling engine 124 to reflect the new operating information.

It will be understood that as monitored system 102 ages, or more specifically the components comprising monitored system 102 age, then the operating parameters, e.g., currents and voltages associated with those components will also change. Thus, the process of calibrating the virtual model based on the actual operating information provides a mechanism by which the virtual model can be aged along with the monitored system 102 so that the comparisons being generated by analytics engine 118 are more meaningful.

Figure 9:
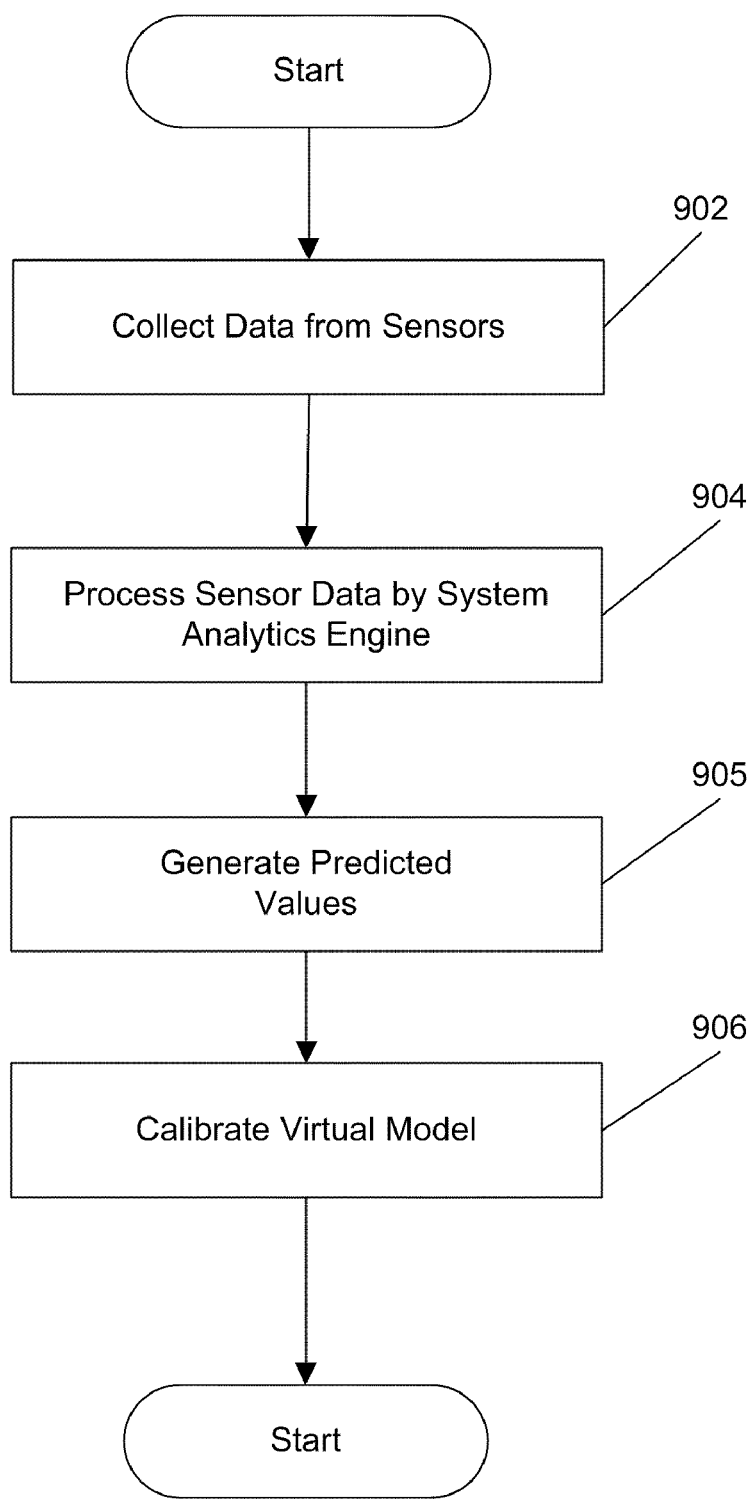
FIG. 9 is a flow chart illustrating an example method for updating the virtual model in accordance with one embodiment.

At a high level, this process can be illustrated with the aid of FIG. 9, which is a flow chart illustrating an example method for updating the virtual model in accordance with one embodiment. In step 902, data is collected from, e.g., sensors 104, 106, and 108. For example, the sensors can be configured to monitor protective devices within an electrical distribution system to determine and monitor the ability of the protective devices to withstand faults, which is describe in more detail below.

In step 904, the data from the various sensors can be processed by analytics engine 118 in order to evaluate various parameters related to monitored system 102. In step 905, simulation engine 124 can be configured to generate predicted values for monitored system 102 using a virtual model of the system that can be compared to the parameters generated by analytics engine 118 in step 904. If there are differences between the actual values and the predicted values, then the virtual model can be updated to ensure that the virtual model ages with the actual system 102.

It should be noted that as the monitored system 102 ages, various components can be repaired, replaced, or upgraded, which can also create differences between the simulated and actual data that is not an alarm condition. Such activity can also lead to calibrations of the virtual model to ensure that the virtual model produces relevant predicted values. Thus, not only can the virtual model be updated to reflect aging of monitored system 102, but it can also be updated to reflect retrofits, repairs, etc.

As noted previously, PUE and DCiE are two very powerful analytic tools which enable, e.g., data center operators to quickly estimate the energy efficiency of their data center, compare the results against other data centers, and determine if any energy efficiency improvements need to be made. PUE is determined by dividing the amount of power entering a data center by the power used to run the computer infrastructure within it, according to equation (1):

$$PUE = \text{Total Facility Power}/\text{IT Equipment Power} \qquad (1)$$

DCiE is the reciprocal of PUE, as shown in equation (2):

$$DCiE = \text{IT Equipment Power}/\text{Total Facility Power} \qquad (2)$$

For equations (1) and (2), the Total Facility Power is the power dedicated solely to the datacenter, e.g., typically the power measured at the utility meter. The IT Equipment Power includes the load associated with all of the IT equipment, such as computer, storage, and network equipment. Additionally, supplemental equipment such as KVM switches, monitors, and workstations/laptops used to monitor or otherwise control the datacenter may be included in the IT Equipment Power.

It should be realized that the larger a company/organization grows, the greater the need to house their computer equipment in a secure environment. Depending on size, that secure environment is called a wiring closet, a computer room, a server room, or a data center. In addition to the energy needed to run that IT equipment, electric power is utilized for lights, security, backup power, and climate control to maintain temperature and humidity levels that will minimize down time due to heat issues.

Benchmarking PUE/DCiE allows data center operators to compare the power needed for business critical IT with the power keeping that IT equipment alive and protected. All IT equipment (and anything run on electricity) generates heat. In a room filled with racks of computers and other IT equipment a significant amount of energy costs are incurred by specialized data center cooling and power equipment deployed to keep the servers and other IT equipment up and running. It has been recognized that heat problems in data centers are a leading cause of downtime.

Having a holistic understanding of a data center's energy consumption is first step in being able to determine the appropriate steps necessary to improve energy efficiency. With proper power measurement of the overall data center IT equipment and infrastructure, the data center operator can determine the PUE and DCiE. After determining the facility's efficiency rating, the data center operator can implement power and cooling best practices to improve efficiency and then monitor how those changes improve the PUE/DCIE. And, as additional IT assets are added to the facility, the process continues showing how much less energy consumption the facility is using. Improvements in DCiE and PUE correlate to improved efficiency, which in turn demonstrate a measurable reduction in the facility's power bill.

Figure 10:
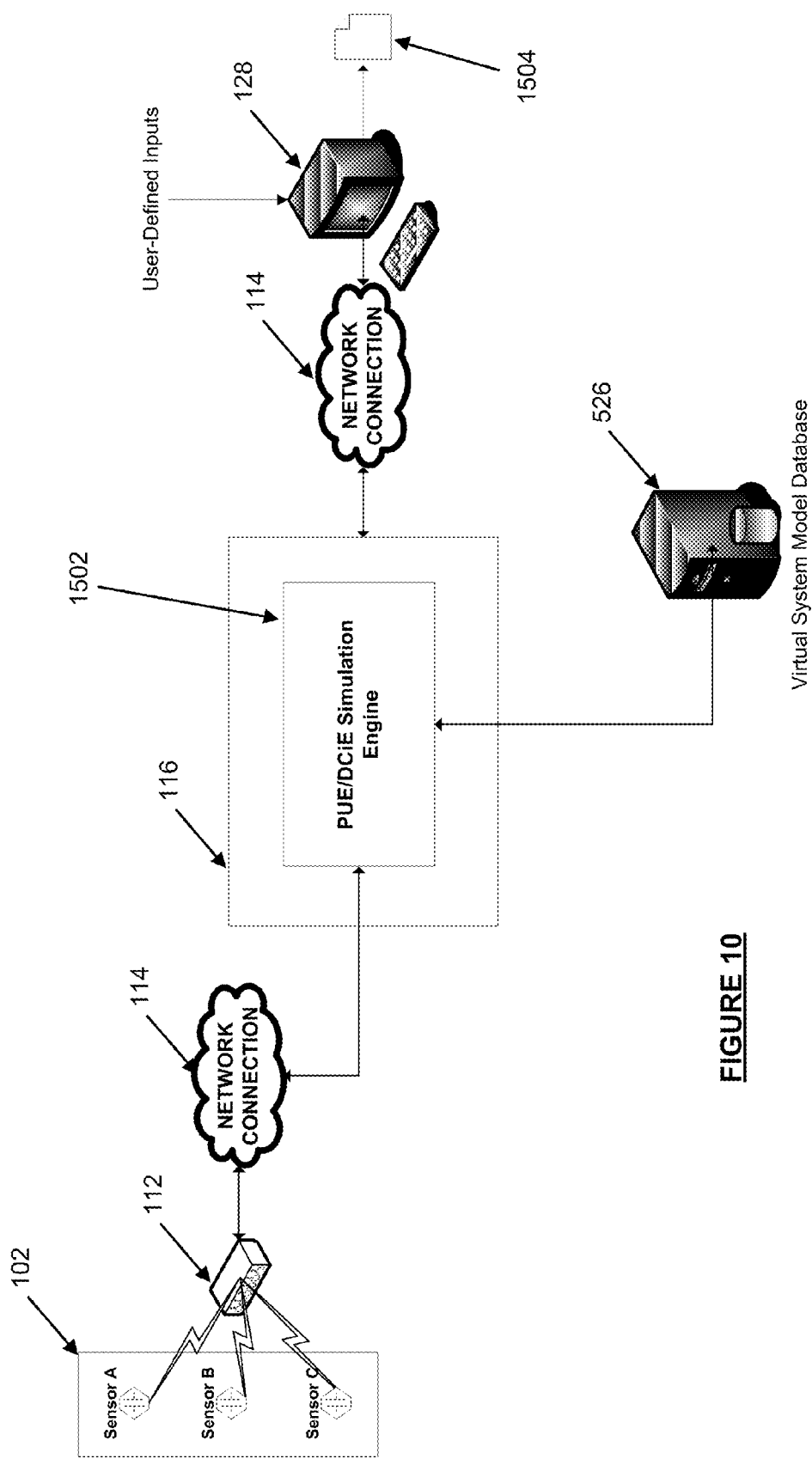
FIG. 10 is a diagram illustrating how a PUE/DCiE Engine works in conjunction with the other elements of the analytics system to make predictions about various aspects of PUE/DCiE on an electrical system, in accordance with one embodiment.

FIG. 10 is a diagram illustrating how a PUE/DCiE simulation engine works in conjunction with the other elements of the analytics system to make predictions about various aspects of PUE/DCiE for a data center, e.g. system electrical 102, in accordance with one embodiment. As depicted herein, the PUE/DCiE simulation engine 1502 can be housed within an analytics server 116 and communicatively connected via a network connection 114 with a data acquisition hub 112, a client terminal 128 and a virtual system model database 526. The virtual system model database 526 can be configured to store a virtual system model of the electrical system 102. The virtual system model can constantly be updated with real-time data from the data acquisition hub 112 to effectively account for the natural aging effects of the hardware that comprise the total electrical system 102, thus, mirroring the real operating conditions of the system.

The PUE/DCiE simulation engine 1502 can be configured to process system data from real-time data fed from the hub 112 and predicted data output from a real-time virtual system model of the electrical system 102 to make predictions about various aspects of a PUE/DCiE for electrical system 102. It should be appreciated that while PUE/DCiE simulation engine 1502 is shown as a single simulation engine, in some embodiments, it may comprise a plurality of simulation engines. For example, in one embodiment, one simulation engine is dedicated to PUE and another simulation engine is dedicated to DCiE.

The data acquisition hub 112 is communicatively connected via data connections 110 to a plurality of sensors that are embedded throughout the electrical system 102. The data acquisition hub 112 can be a standalone unit or integrated within the analytics server 116 and can be embodied as a piece of hardware, software, or some combination thereof. In one embodiment, the data connections 110 are "hard wired" physical data connections, e.g., serial, network, etc. For example, a serial or parallel cable connection between the sensors and the hub 112. In another embodiment, the data connections 110 are wireless data connections. For example, a radio frequency (RF), BLUETOOTH™, infrared or equivalent connection between the sensor and the hub 112.

Continuing with FIG. 10, the client 128 is typically a conventional "thin-client" or "thick client" computing device that may utilize a variety of network interfaces, e.g., web browser, CITRIX™, WINDOWS TERMINAL SERVICES™, telnet, or other equivalent thin-client terminal applications, etc., to access, configure, and modify the sensors, e.g., configuration files, etc., analytics engine, e.g., configuration files, analytics logic, etc., calibration parameters, e.g., configuration files, calibration parameters, etc., PUE/DCiE Simulation Engine, e.g., configuration files, simulation parameters, etc., and virtual system model of the electrical system 102 under management, e.g., virtual system model operating parameters and configuration files. Correspondingly, in one embodiment, the data from the various components of the electrical system 102 and the real-time predictions (forecasts) about the various aspects of PUE/DCiE on the system can be communicated on a client 128 display panel for viewing by a system administrator or equivalent. For example, the aspects may be communicated by way of graphics, i.e., charts, icons, etc., or text displayed on the client 128 display panel. In another embodiment, the aspects can be communicated by way of synthesized speech or sounds generated by the client 128 terminal. In still another embodiment, the aspects can be summarized and communicated on a hard copy report 1502 generated by a printing device interfaced with the client 128 terminal. In yet still another embodiment, the aspects can be communicated by way of labels generated by a printing device interfaced with the client 128 terminal. It should be understood, however, that there are a myriad of different methods available to communicate the aspects to a user and that the methods listed above are provided here by way of example only.

As discussed above, the PUE/DCiE simulation engine 1502 can be configured to work in conjunction with a real-time updated virtual system model of the electrical system 102 to make predictions (forecasts) about certain aspects of PUE/DCiE of the electrical system 102. For example, in one embodiment, the PUE/DCiE simulation engine 1502 can be used to make predictions what the PUE/DCiE of the electrical system 102 would be based on proposed changes to the power infrastructure or power network.

In order to calculate the PUE/DCiE, data must be collected about the facility's electrical system 102. This data is provided by a virtual system model of the electrical system 102 stored on the virtual system model database 526 communicatively linked to the PUE/DCiE simulation engine 1502. As discussed above, the virtual system model is continuously updated with real-time data provided by a plurality of sensors interfaced to the electrical system 102 and communicatively linked to the data acquisition hub 112. In one embodiment, this data includes the arrangement of components on a one-line drawing with nameplate specifications for every device comprising the electrical system. Also included are details of the lengths and cross section area of all cables.

Once the data has been collected, a base-line model is created which determines the PUE and DCiE of the electrical system 102 according to Equations (1) and (2). It should be realized that the base-line model may be created using historical data of electrical system 102 and an approximate accounting of the equipment of the data center. In some embodiments, the base-line model is created using design parameters entered by the data center operators, which may or may not be based on historical data. For example, in some embodiments, the base-line model may be created utilizing data obtained from another data center. In other embodiments, the base-line model may be created utilizing data derived from average expected consumption of each component within the data center.

Subsequently, the base-line model is validated using actual acquired data in real-time and a refined or calibrated model, e.g., actual model, of the facility. In one embodiment, the validation includes calculating the PUE/DCiE of the refined model and comparing it to the PUE/DCiE of the base-line model. The real-time data is acquired as described above—the virtual system model is continuously updated with real-time data provided by a plurality of sensors interfaced to the electrical system 102 and communicatively linked to the data acquisition hub 112

The refined model of the facility is created by more thorough accounting of the equipment in the data center. For example, for the total facility power, each of the transformers in the data center can be monitored individually. Additionally, for the IT equipment power, measuring the uninterruptible power supply (UPS) and taking into account electrical losses will result in more refined model of the facility.

In validating the base-line model, the refined model using real-time data validates current assumptions and creates an accurate base-line for projections of any envisioned changes to the facility. Specifically, the projections allow the data center operator or a user to project potential changes on either the calculation or PUE or DCiE.

Figure 11:
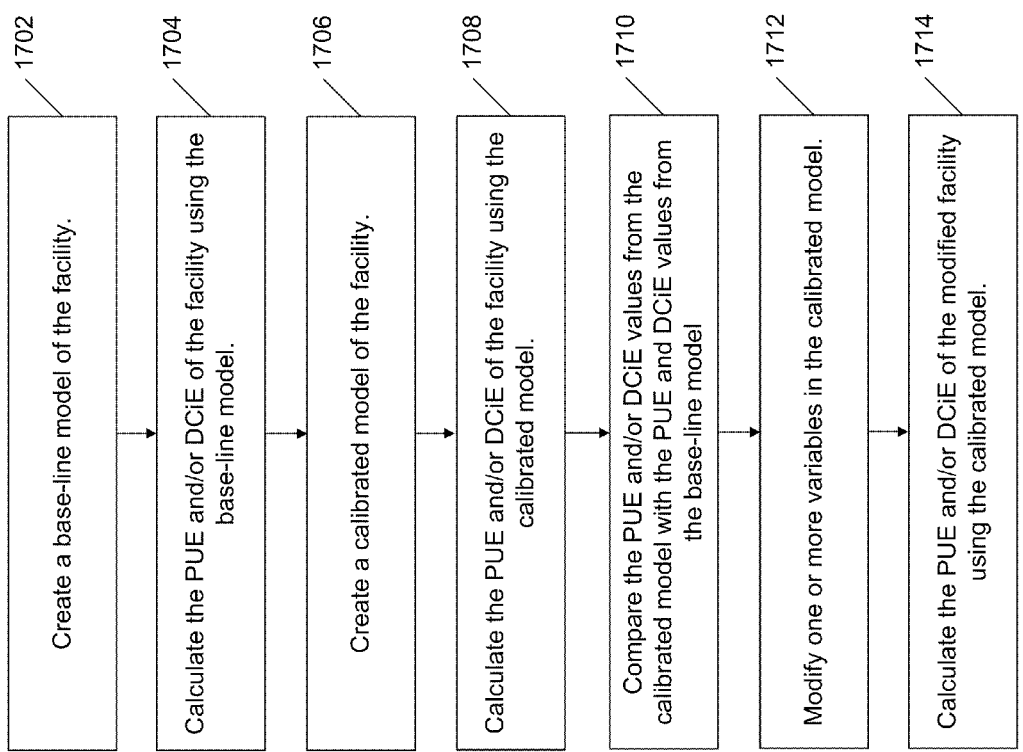
FIG. 11 is a flow chart illustrating an example process for predicting, in real-time, various aspects associated with PUE/DCiE, in accordance with one embodiment.

FIG. 11 is a flow chart illustrating an example process for predicting, in real-time, the PUE/DCiE of an electrical system, in accordance with one embodiment. In the process illustrated in FIG. 11, the results are accurate and reflect the correct PUE/DCiE. Further, the system operator is provided the ability to perform the same balanced analysis based on hypothetical conditions to determine the probable results and impact prior to making any physical change to the environment providing "what if" planning.

The process of FIG. 11 builds on the data acquired and analyzed in real-time as described above. Thus, process illustrated in FIG. 11 provides an automated method for determining the PUE/DCiE based on empirical and/or measured values and does not rely on the subjective analysis or incorrect assumptions of typical static or off line systems First, in step 1702, a base-line model of the facility is created. As described above, the base-line model may be created based on historical data. Next, in step 1704, the PUE and/or DCiE of the facility are calculated using the base-line model.

In step 1706, a calibrated model of the facility is created. As described above, the calibrated model utilizes real-time data and takes into account actual equipment or components in the facility. Next, in step 1708, the PUE and/or DCiE of the facility are calculated using the calibrated model.

In step 1710, the PUE and/or DCiE values from the calibrated model are compared with the PUE and/or DCiE values from the base-line model. This comparison provides validation of the base-line model. For example, if the PUE and/or DCiE values from the calibrated model and base-line model within a predetermined range—such as within 10% of each other, then the base-line model is determined to be fairly accurate and validated.

In step 1712, a user or the data center operator modifies one or more variables in the calibrated model. For example, the user may add equipment to the facility to determine what the increase in PUE and/or DCiE would be for the additional equipment. In step 1714, the PUE and/or DCiE of the modified facility are calculated using the calibrated model.

The embodiments described herein, can be practiced with other computer system configurations including hand-held devices, microprocessor systems, microprocessor-based or programmable consumer electronics, minicomputers, mainframe computers and the like. The embodiments can also be practiced in distributing computing environments where tasks are performed by remote processing devices that are linked through a network.

It should also be understood that the embodiments described herein can employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations that form part of the embodiments described herein are useful machine operations. The invention also relates to a device or an apparatus for performing these operations. The systems and methods described herein can be specially constructed for the required purposes, such as the carrier network discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The embodiments described herein can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

Certain embodiments can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

Although a few embodiments of the present invention have been described in detail herein, it should be understood, by those of ordinary skill, that the present invention may be embodied in many other specific forms without departing from the spirit or scope of the invention. Therefore, the present examples and embodiments are to be considered as illustrative and not restrictive, and the invention is not to be limited to the details provided therein, but may be modified and practiced within the scope of the appended claims.

What is claimed:

1. A system for making real-time predictions about power usage efficiency (PUE) of an electrical system, the system comprising:
   a data acquisition component communicatively connected to one or more sensors configured to acquire real-time data output from the electrical system of a data center, wherein the real-time data output comprises real-time data for one or more transformers in the data center and real-time data for one or more power supplies providing power to information technology (IT) equipment in the data center; and
   an analytics server communicatively connected to the data acquisition component, the analytics server comprising
      a virtual system modeling engine configured to generate predicted data output for the electrical system using a virtual system model of the electrical system,
      an analytics engine configured to monitor the real-time data output and the predicted data output of the electrical system, and validate the virtual system model using the real-time data output, and
      a PUE simulation engine configured to receive one or more modifications for the data center, modify a copy of the validated virtual system model based on the received modifications, and use the modified copy of the validated virtual system model, to forecast the PUE for the data center with the one or more modifications, wherein the PUE comprises a ratio of total power dedicated solely to the data center to a measure of load associated with the IT equipment in the data center.

2. The system for making real-time predictions about PUE of an electrical system, as recited in claim 1, further comprising a client terminal communicatively connected to the analytics server and configured to communicate the forecasted PUE.

3. The system for making real-time predictions about PUE of an electrical system, as recited in claim 1, wherein the forecasted PUE is communicated by way of graphics on a display interfaced with the client terminal.

4. The system for making real-time predictions about PUE of an electrical system, as recited in claim 1, wherein the forecasted PUE is communicated by way of text on a display interfaced with the client terminal.

5. The system for making real-time predictions about PUE of an electrical system, as recited in claim 1, wherein the forecasted PUE is communicated by way of a paper report generated by a printing device interfaced with the client terminal.

6. The system for making real-time predictions about PUE of an electrical system, as recited in claim 1, wherein the PUE simulation engine is further configured to use the validated virtual system model to forecast data center infrastructure efficiency (DCiE).

7. The system for making real-time predictions about PUE of an electrical system, as recited in claim 1, wherein the analytics server is configured to:
   create a base-line PUE model of the electrical system; and
   calculate the PUE of the electrical system using the base-line PUE model.

8. The system for making real-time predictions about PUE of an electrical system, as recited in claim 7, wherein the analytics server is further configured to:
   create a calibrated PUE model of the electrical system; and
   calculate the PUE of the electrical system using the calibrated PUE model.

9. The system for making real-time predictions about PUE of an electrical system, as recited in claim 8, wherein the analytics server is further configured to:
   compare the PUE calculated from the calibrated PUE model with the PUE calculated from the base-line PUE model to validate the base-line model.

10. The system for making real-time predictions about PUE of an electrical system, as recited in claim 9, wherein the base-line PUE model is validated if the PUE values from the calibrated model and base-line model are within a predetermined range.

11. The system for making real-time predictions about PUE of an electrical system, as recited in claim 9, wherein the analytics server is further configured to:
   update the calibrated PUE model with a first modification to the electrical system; and
   calculate the PUE of the electrical system using the updated calibrated PUE model.

12. The system for making real-time predictions about PUE of an electrical system, as recited in claim 11, wherein the analytics server is further configured to:
   update the calibrated PUE model with a second modification to the electrical system; and
   calculate the PUE of the electrical system using the updated calibrated PUE model.

13. A system for making real-time predictions about data center infrastructure efficiency (DCiE) of an electrical system, the system comprising:
   a data acquisition component communicatively connected to one or more sensors configured to acquire real-time data output from the electrical system of a data center, wherein the real-time data output comprises real-time data for one or more transformers in the data center and real-time data for one or more power supplies providing power to information technology (IT) equipment in the data center; and
   an analytics server communicatively connected to the data acquisition component, the analytics server comprising
      a virtual system modeling engine configured to generate predicted data output for the electrical system using a virtual system model of the electrical system,
      an analytics engine configured to monitor the real-time data output and the predicted data output of the electrical system, and validate the virtual system model using the real-time data output, and
      a DCiE simulation engine configured to receive one or more modifications for the data center, modify a copy of the validated virtual system model based on the received one or more modifications, and use the modified copy of the validated virtual system model to forecast the DCiE for the data center with the one or more modifications, wherein the DCiE comprises a ratio of a measure of load associated with the IT equipment in the data center to a total power dedicated solely to the data center.

14. The system for making real-time predictions about DCiE of an electrical system, as recited in claim 13, further comprising a client terminal communicatively connected to the analytics server and configured to communicate the forecasted DCiE.

15. The system for making real-time predictions about DCiE of an electrical system, as recited in claim 13, wherein the forecasted DCiE is communicated by way of graphics on a display interfaced with the client terminal.

16. The system for making real-time predictions about DCiE of an electrical system, as recited in claim 13, wherein the forecasted DCiE is communicated by way of text on a display interfaced with the client terminal.

17. The system for making real-time predictions about DCiE of an electrical system, as recited in claim 13, wherein the analytics server is configured to:
   create a base-line DCiE model of the electrical system; and
   calculate the DCiE of the electrical system using the base-line DCiE model.

18. The system for making real-time predictions about DCiE of an electrical system, as recited in claim 17, wherein the analytics server is further configured to:
   create a calibrated DCiE model of the electrical system; and
   calculate the DCiE of the electrical system using the calibrated DCiE model.

19. The system for making real-time predictions about DCiE of an electrical system, as recited in claim 18, wherein the analytics server is further configured to:
   compare the DCiE calculated from the calibrated DCiE model with the DCiE calculated from the base-line DCiE model to validate the base-line model.

20. The system for making real-time predictions about DCiE of an electrical system, as recited in claim 19, wherein the base-line DCiE model is validated if the DCiE values from the calibrated model and base-line model are within a predetermined range.

21. The system for making real-time predictions about DCiE of an electrical system, as recited in claim 19, wherein the analytics server is further configured to:
   update the calibrated DCiE model with a first modification to the electrical system; and
   calculate the DCiE of the electrical system using the updated calibrated DCiE model.

22. The system for making real-time predictions about DCiE of an electrical system, as recited in claim 21, wherein the analytics server is further configured to:
   update the calibrated DCiE model with a second modification to the electrical system; and
   calculate the DCiE of the electrical system using the updated calibrated DCiE model.

* * * * *